United States Patent [19]
Mikasa

[11] 3,951,544
[45] Apr. 20, 1976

[54] PRINTING PAPER CUTTING DEVICE FOR USE IN COPYING APPARATUS

[75] Inventor: Yoshio Mikasa, Toyokawa, Japan

[73] Assignee: Minolta Camera Kabushiki Kaisha, Osaka, Japan

[22] Filed: Sept. 30, 1974

[21] Appl. No.: 510,858

[30] Foreign Application Priority Data

Oct. 26, 1973 Japan ........................ 48-124897[U]

[52] U.S. Cl. ........................................ 355/29; 355/8; 355/14

[51] Int. Cl.[2] ........................................ G03B 29/00

[58] Field of Search ............... 355/28, 13, 14, 8, 29; 83/203, 205

[56] References Cited

UNITED STATES PATENTS

| | | | |
|---|---|---|---|
| 3,614,220 | 10/1971 | Komori et al. | 355/8 X |
| 3,651,727 | 3/1972 | Suzuki et al. | 355/13 X |
| 3,653,757 | 4/1972 | Newcomb | 355/13 |
| 3,779,114 | 12/1973 | Rabin | 355/13 X |

*Primary Examiner*—R. L. Moses
*Attorney, Agent, or Firm*—Wenderoth, Lind & Ponack

[57] ABSTRACT

A printing paper cutting device to be incorporated in an electrophotographic copying apparatus employing a roll of printing paper, in which cutting device, the lock releasing means for the reciprocating platform on which an original to be copied is placed and printing paper transportation means such as rollers are advantageously utilized for starting and operation of the cutting device in order to simplify the construction of the cutting device resulting in a low cost and compact size of the copying apparatus, and moreover, the desired lengths to be cut can be readily and quickly set by a cut length setting knob associated with click means without any individual variations.

18 Claims, 6 Drawing Figures

PRINTING PAPER CUTTING DEVICE FOR USE IN COPYING APPARATUS

Figure 1:
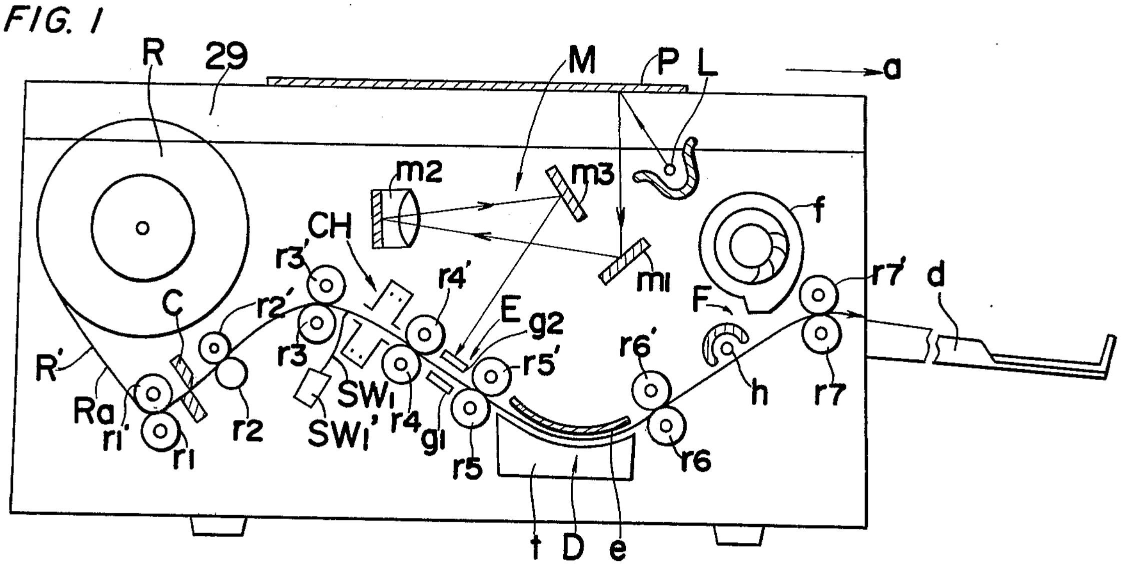

The present invention relates to an electrophotographic copying apparatus and more particularly, to a printing paper cutting device for use therein.

Conventionally, there has been a demand for compact size and simplicication of electrophotographic copying apparatus with a reciprocating platform on which an original to be copied is placed. However, in such a conventional copying apparatus in which a roll of printing paper is employed, a printing paper cutting device controlled by a cut size setting knob mounted on the apparatus housing to adjust the length of the printing paper to be cut is installed independently of other devices of the copying apparatus, resulting in the complication of the copying apparatus without meeting the above described demand.

Moreover, the cutting size setting knob employed with the conventional cutting device as described above tends to be troublesome to handle requiring time for very correct setting and still giving rise to individual variations in cut lengths, which fact affects adversely routine copying operations wherein most of the copies required are of regular sizes, for example, A4 and B5 sizes and consequently the cut length settings are made to these regular sizes most frequently, since the unification of the copy sizes into standard sizes is desirable for the efficient arrangement of documents. In other words, in the conventional cutting device, even when a desired cut length is set, the individual variations in setting the cut length setting knob give rise to deviation in the cut lengths to a certain extent.

Furthermore, in some of the conventional printing paper cutting devices, the position of a microswitch or a rotating member for actuating the microswitch is shifted by a knob mounted on the copying apparatus housing for varying the angle of rotation of the microswitch or the rotating member to adjust the cut length of the printing paper drawn from the paper roll, which cutting device, however, has such disadvantages that subsequent copying operations can not be carried out until the rotating member for the actuation of the microswitch returns to the original starting position for copying after completing exactly one revolution from the starting of rotation thereof, which fact results in slow copying speed, requiring complicated mechanisms to return the rotating member quickly to the original starting position for copying after the member has actuated the microswitch in order to overcome the above described disadvantages.

Accordingly, an essential object of the present invention is to provide a cutting device for printing paper drawn off a paper roll which is simple in construction and compact in size and can be manufactured at low cost with substantial elimination of the disadvantages inherent in the conventional cutting devices.

Another important object of the present invention is to provide a cutting device of the above described type which has a cut length setting knob which can be set readily and quickly without individual variations in the cut lengths.

A still further object of the present invention is to provide a cutting device of the above described type which can be associated with the mechanisms of the copying apparatus without any adverse effect on the copying speed.

According to a preferred embodiment of the present invention, the cutting device takes into consideration the fact that a copying apparatus with a reciprocating platform generally has a locking member to lock the platform at a predetermined position, means for releasing the locking of the platform for advancing the platform, and means for printing paper transportation such as rollers. More particularly, the cutting device of the invention comprises platform lock releasing means operated by a signal from the platform driving means actuating microswitch disposed along the path of the paper web from a paper roll, which microswitch is actuated by the passage of the paper web through paper transportation rollers, a cam plate locking member to be operated and released in association with the platform lock releasing means, a cam plate which makes one revolution in association with a printing paper feeding roller at the same time as the releasing of the cam plate locking member, a cut length setting lever which makes one revolution with the cam plate after being positioned, step by step, at a desired position on the cam plate according to the length of the original through the click means associated with a cut length setting knob, a cutting instruction microswitch to be actuated by the cut length setting lever, and cutting means operated by a signal from the cutting instruction switch. Since the platform lock releasing means and the paper transportation means are advantageously utilized for the starting of the cutting means and for driving the same, the construction of the cutting device is greatly simplified with resultant low cost and reduction of the size of the copying apparatus.

The provision of the click means associated with the cut length setting lever and knob is particulary effective for setting the cut lengths readily and quickly without any individual variations in cut lengths of the printing paper.

Figure 2:
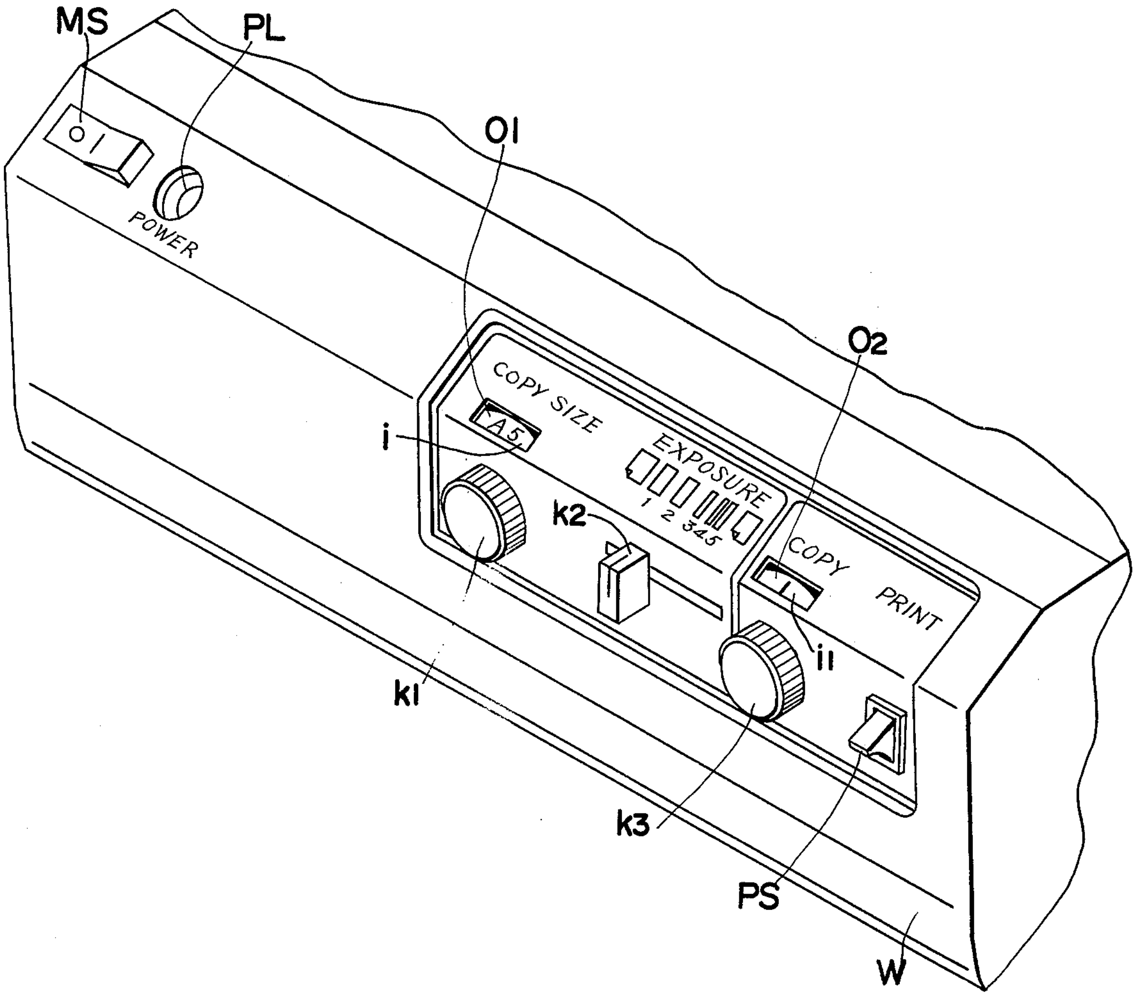
Figure 3:
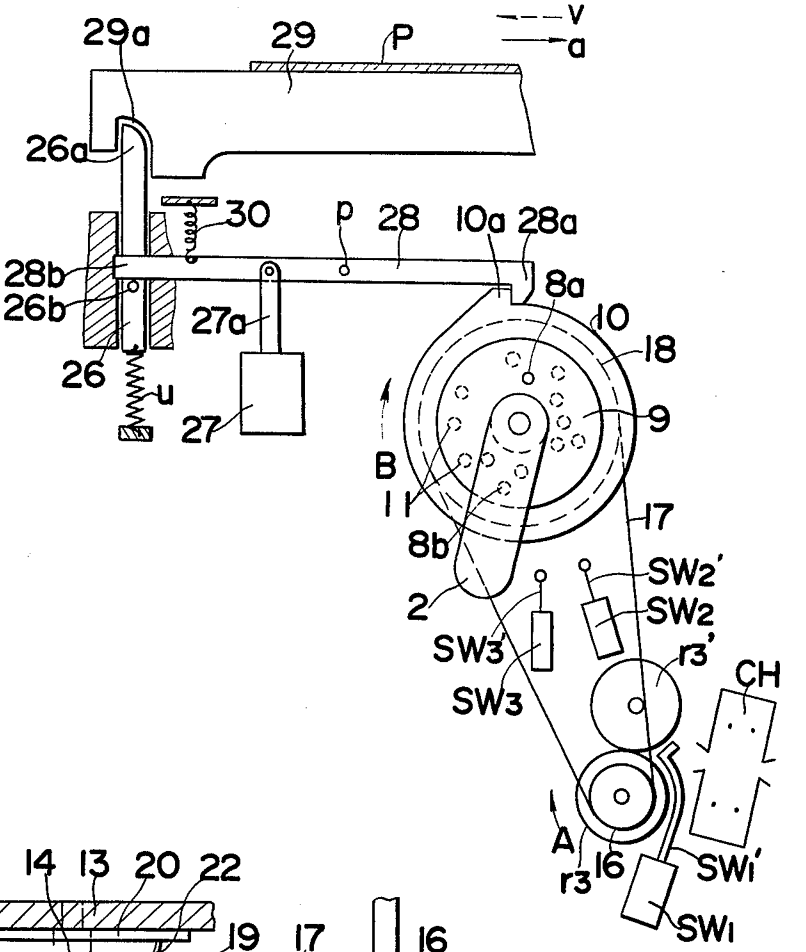
Figure 4:
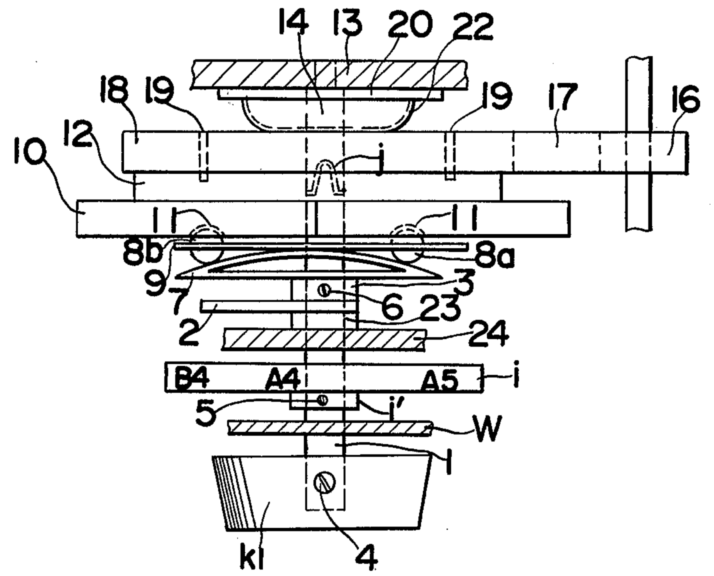
Figure 5:
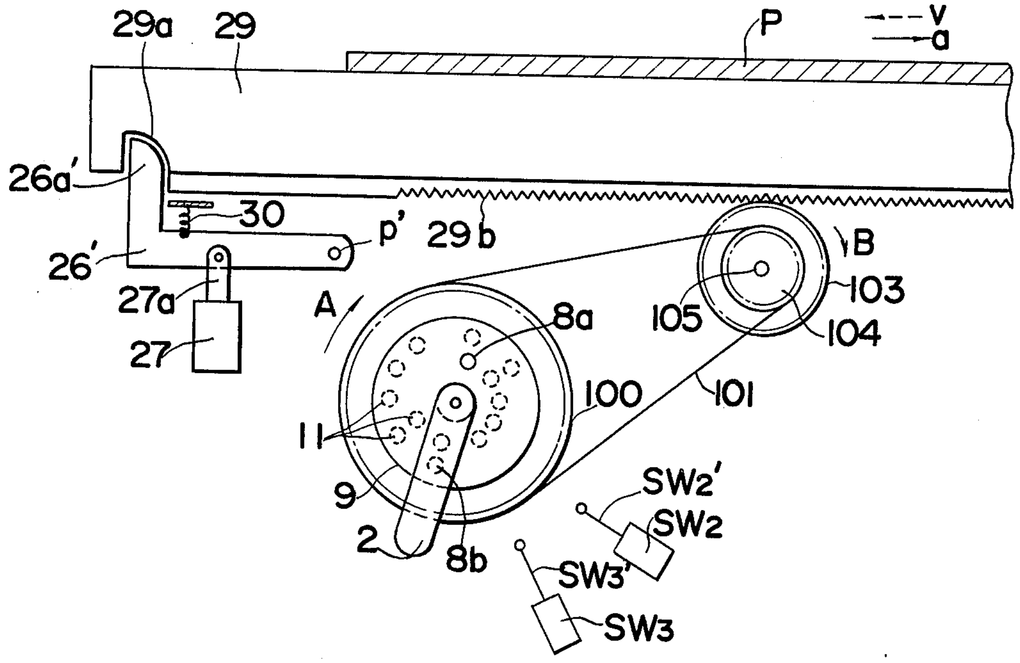
Figure 6:
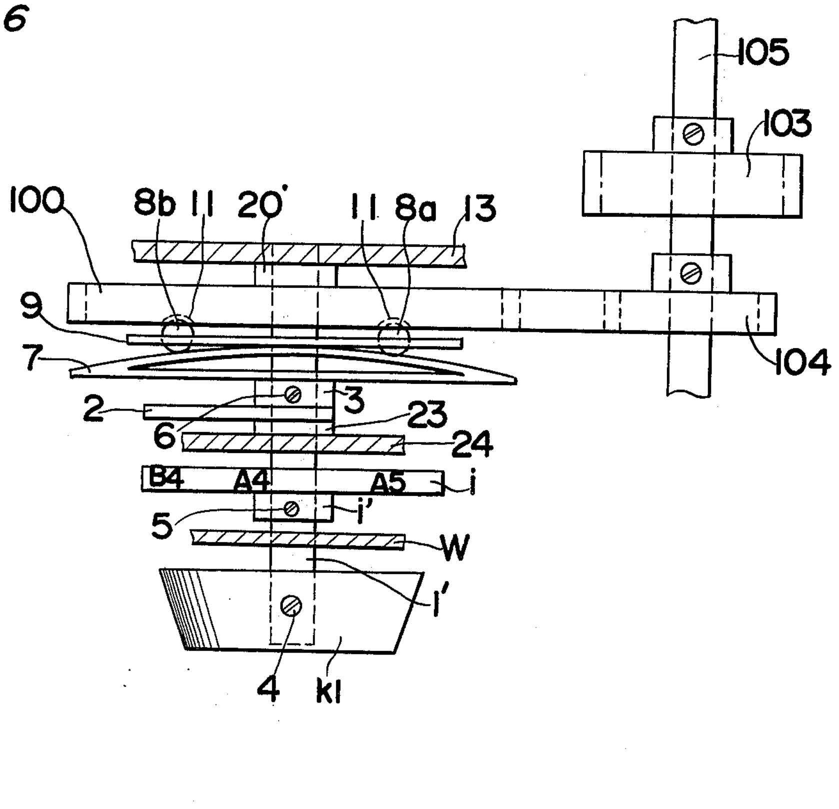

These and other objects and features of the present invention will become apparent from the following description taken in conjunction with the preferred embodiment thereof with reference to the attached drawings in which;

FIG. 1 is a schematic sectional side view of an electrophotographic copying apparatus in which the printing paper cutting device of the invention may be incorporated, FIG. 2 is a perspective view, on an enlarged scale, of a control panel for the cutting device of the invention, FIG. 3 is a schematic diagram showing a side view of an embodiment of the cutting device of the invention, FIG. 4 is a top plan view, partly in section and partly broken away of a cut length setting knob for the cutting device of FIG. 3, particularly showing the construction thereof, FIG. 5 is a schematic diagram showing a side view of a modification of the embodiment of FIG. 3, and FIG. 6 is a top plan view, partly in section and partly broken away of a cut length setting knob for the cutting device of FIG. 5, particularly showing the construction thereof.

Before the description of the present invention proceeds, it is to be noted that like parts are designated by like numerals throughout the several views of the accompanying drawings.

Referring to FIGS. 1 and 2, there is shown, for a general understanding, a slit exposure type electrophotographic copying apparatus with a movable platform on which an original to be copied is placed, in which the printing paper cutting device of the invention may be incorporated.

In FIG. 1, a web of printing paper R' from a roll R of the printing paper rotatably supported at the upper left portion of the copying apparatus is drawn by a pair of rollers *r*1', *r*1 and subsequently transported through pairs of rollers *r*2', *r*2, *r*3', *r*3, *r*4', *r*4, *r*5', *r*5, *r*6', *r*6, and *r*7', *r*7 disposed sequentially along a path R*a* for the printing paper R'. The feeding rollers *r*1', *r*1 disposed adjacent to the paper roll R are adapted to function when a printing button PS (FIG. 2) mounted on a control panel W disposed at the front portion of the copying apparatus is depressed, and to stop functioning for suspending the feeding of the printing paper R' at the moment when a cutter means C disposed between the roller pairs *r*1', *r*1 and *r*2', *r*2 is operated by a cutting signal described later. A microswitch SW1 disposed along the paper path R*a* between the rollers *r*3', *r*3 and a pair of corona chargers CH facing each other is for releasing the locking of the platform 29 horizontally, reciprocatingly supported at the upper portion of the copying apparatus to allow the platform 29 with the original P to be copied thereon to move in the scanning direction shown by an arrow a, and also for energizing the corona chargers CH, a light source L disposed below and adjacent to the platform 29 for illuminating the original P and a clutch (not shown) for reciprocating the platform 29. The optical system M disposed between the platform 29 and the paper path R*a* comprises a mirror m1 fixedly provided below the platform 29 and inclined at approximately 45° with respect to the platform 29 for directing the image rays from the original P to a mirror m3 through a mirror lens m2, which mirror m3 in turn directs the image rays onto an exposure device E having a pair of transparent guide plate g1 and g2 which are disposed between the roller pairs *r*4', *r*4 and *r*5', *r*5 so as to form the image of the original P on the printing paper R' which is transported along the path R*a* in synchronization with the scanning movement of the platform 29. The printing paper R' thus exposed is subsequently developed in a developing device D having a developing tank t and an electrode plate e and then fixed at a fixing device F including a heater *h* and a fan *f* for being discharged onto a tray *d*.

In FIG. 2, there is shown the control panel W provided at the front portion of the copying apparatus. on the panel W, there are disposed a main switch MS, a pilot lamp PL, a cut size setting knob k1 associated with a cut size indication disc *i*, on the outer periphery of which disc *i* copy sizes such as B4, A4 and B5 etc. are marked for the confirmation of the size to be cut through the opening O1, an exposure adjusting knob *k*2 with corresponding scalemarks, a continuous copying knob *k*3 with associated indication disc *i*1 for showing the number of copies to be made through an opening O2 and the printing button PS. The cut size setting knob *k*1 in FIG. 2 is set to cut the printing paper web R' from the roll R into a size A5.

Referring now to FIGS. 3 and 4, the cut size setting knob *k*1, hub *i'* of the cut size indication disc i, and the hub 3 which is in integral connection with a cut length setting lever 2 are fixedly mounted, by securing screws 4, 5 and 6, on a shaft 1 rotatably supported by the frame 24 of the apparatus and the wall of the control panel W, so that the cut length setting lever 2 is adapted to move in association with the cut size setting knob *k*1.

The movement of the lever 2 is controlled, step by step, by click means comprising, for example, a click spring 7, click balls 8*a* and 8*b* supported by a click ball supporting plate 9 which is disposed between the click spring 7 and a cam plate 10 and which is adapted to move integrally with the lever 2 with the ball 8*a* located closer to the shaft 1 than the ball 8*b* for stabilizing the click spring 7, and corresponding dents 11 for the balls 8*a* and 8*b* formed in the surface of the cam plate 10. The hub 3 is fixed on the shaft 1 in such a position that the balls 8*a* and 8*b* are urged onto the surface of the cam plate 10 through the click spring 7, and when the balls 8*a* and 8*b* fall into the dents 11, the lever 2 rotates together with the support plate 9 with the rotation of the cam plate 10.

A friction plate 12 is rotatably mounted on a shaft 14 which is fixed coaxially with the shaft 1 on a side wall 13 of the apparatus and which is engaged with the shaft 1 at a junction j in such a manner as to allow the shaft 1 to be rotated freely.

A timing belt 17 is directed over a large gear 18 fixed to the plate 12 by securing screws 19 and a small gear 16 fixed on the same axis as the paper feeding roller *r*3 which is continuously rotated in the direction shown by the arrow A by a driving means (not shown), so that the plate 12 is rotated in the direction of the arrow B. A spring 22 contacting the side wall 13 through a large washer 20 for smooth rotation is provided between the side wall 13 and the large gear 18 for urging the plate 12 toward the cam plate 10 so that when the locking of the cam plate 10 is released in a manner described later, the cam plate 10 which is in slipping contact with the plate 12 during the locking, rotates together with the friction plate 12. A small washer 23 is disposed between the lever 2 and the side wall 24 for preventing axial play of the members described above.

Referring particularly to FIG. 3, a lever 28 having a projection 28*a* extending downward at right angles from one end thereof for engaging with a notch portion 10*a* of the cam plate 10 is disposed below and in parallel to the platform 29 is pivotally connected at the middle portion thereof to the frame of the apparatus by a pin p. The other end 28*b* of the lever 28 is adapted to engage a pin 26*b* mounted on a platform locking lever 26 which is disposed at the end 28*b* of the lever 28 in a direction normal to the axis of the lever 28 and which is slidably supported by the frame of the apparatus. The upper end 26*a* of the lever 26 is adapted to engage a notch 29*a* formed in the under surface of the platform 29 with the lever 26 urged upward at the lower end thereof by biasing means, for example, by a compression spring *u*. The lever 28 is normally urged clockwise about the pin *p* by a spring 30 stretched between the lever 28 and the frame of the apparatus at a position adjacent the end 28*b* thereof, while a plunger 27*a* of a platform lock releasing solenoid 27 is connected to the lever 28 at a position between the spring 30 and the pin *p* for turning the lever 28 counterclockwise about the pin *p* when the solenoid 27 is energized for releasing the locking of the cam plate 10 and the platform 29 simultaneously.

The microswitch SW1 disposed adjacent to the feeding roller r3 is adapted to actuate platform driving means (not shown) and the platform lock releasing solenoid 27 momentarily. microswitches SW2 and SW3 are disposed close to the lever 2, the former being for generating a cutting instruction signal, while the latter is for de-energizing the corona chargers CH, the light source L and the platform advancing clutch (not shown) and also for actuating the platform returning clutch (not shown), which mocroswitches SW2 and SW3 are adapted to function when the actuators SW2′ and SW3′ thereof are kicked by the lever 2 during rotation of the latter in the direction of the arrow B. The microswitch SW3 is disposed in such a position that the actuator SW3′ thereof is kicked by the lever 2 for actuation when the trailing edge of the cut printing paper sheet leaves the exposure position E.

With this arrangement, the cut size setting knob *k*1 is turned to a position corresponding to the size of the original P placed on the platform 29 for setting lever 2 on the cam plate 10 through the click means, for example, at a position shown in FIG. 3. Subsequently, when the printing button PS (FIG. 2) on the control panel W is depressed, the paper feeding rollers *r*1′, *r*1 and the paper transportation rollers *r*2′, *r*2, *r*3′, *r*3, *r*4′, *r*4, *r*5′, *r*5 *r*6′, *r*6 and *r*7′, *r*7 start rotating with the leading edge of the printing paper web R′ reaching the microswitch SW1 through cutter means C and the roller pairs *r*2′, *r*2 and *r*3′, *r*3. Upon depression of the actuator SW1′ by the leading edge of the paper web R′, the corona chargers CH and the exposure light source L are energized with the platform lock releasing solenoid 27 and the driving means (not shown) for the platform 29 being actuated through an electric circuit (not shown). The actuation of the solenoid 27 turns the lever 28 counterclockwise about the pin p by movement of the plunger 27*a* and the projection 28*a* of the lever 28 is disengaged from the notch 10*a* of the cam plate 10 and the other end of the lever 28 engages the pin 26*b* of the platform locking lever 26 so as to push the lever 26 downward, pulling the upper end 26*a* of the lever 26 out of the notch 29*a* of the platform 29 and consequently releasing the platform 29. The platform 29 thus released starts advancing in the scanning direction due to the action of the driving means (not shown).

Simultaneously, the cam plate 10 which is released from the locking by the lever 28 as described above starts rotating in the direction of the arrow B together with the friction plate 12 and consequently with the lever 2. When the lever 12 kicks the actuator SW2′ of the microswitch SW2 as the former rotates, the rollers *r*1′ and *r*1 stops rotating and the cutter C is operated simultaneously for cutting the paper web R′ through an electric circuit (not shown), in which case the length of the printing paper R′ to be cut is determined by the angle of rotation of the lever 2 from the start of rotation thereof to the actuation of the microswitch SW2 thereby, and the distance between the cutter C and the microswitch SW1 along the paper path R*a*′.

After actuating the actuator SW2′ of the switch SW2, the lever 2 further rotates and kicks the actuator SW3′ of the microswitch SW3, at the moment when the trailing edge of the cut printing paper leaves the exposure position E, for de-energizing the corona chargers CH and the exposure lamp L and also for disengaging a platform advancing clutch (not shown) and engaging a platform returning clutch to return the platform 29 in the returning direction shown by the dotted line arrow v.

When the lever 2 completes one rotation with the cam plate 10 after actuating the microswitch SW3, the projection 28*a* of the lever 28 urged clockwise by the spring 30 engages the notch 10*a* of the cam plate 10 and the rotation of the cam plate 10 and the lever 2 is stopped, while the upper end 26*a* of the platform locking bar 26 urged upward by the spring means u is inserted into the notch 29*a* of the platform 29. Meanwhile, the cut printing paper processed through the corona chargers CH, the exposure device E, the developing device D and the fixing device F is discharged onto the tray *d*.

As is clear from the foregoing description, in the printing paper cutting device according to the present invention, since the cut length setting lever is adapted to make one revolution in association with the platform lock releasing means through rotation of the printing paper feeding roller, it is possible to simplify the construction of the printing paper cutting device so that it can be made compact and at a low cost.

Furthermore, the adoption of the click means for the cut size setting knob is very effective for quick and easy setting for desired cut lengths without any individual variations.

Referring now to FIGS. 5 and 6, there is shown a modification of the device of FIG. 3. In this modification, a large gear 100 which is rotatably mounted on a shaft 1′ also rotatably supported by the frames 13 and 24 of the apparatus and the wall of the control panel W is employed instead of the cam plate 10, the friction plate 12, the gear 18 and the spring 22 in the embodiment of FIGS. 3 and 4 with a washer 20′ disposed between the gear 100 and the frame 13 of the apparatus. The click balls 8*a* and 8*b* supported by the supporting plate 9 are pressed against the gear 100 by the click spring 7, by the hub 3 which is in integral connection with the cutting length setting lever 2 and which is secured to the shaft 1′ by the securing screw 6, so that when the balls 8*a* and 8*b* fall into the dents 11 by turning the knob *k*1 for setting the desired cut length of the printing paper, the lever 2 rotates following the rotation of the gear 100. Since the rest of the construction and functions of the knob *k*1 assembly are the same as in the embodiment in FIG. 4, the description thereof is abbreviated for brevity. A chain 101 is directed over the gear 100, and a small gear 104 fixedly mounted on the same shaft 105 as a pinion gear 103 which engages a rack 29*b* provided on the lower side edge of the platform 29 and which is connected to a driving means (not shown) by platform advancing and returning clutches (not shown) for positively transmitting the rotation of the gear 103 to the large gear 100.

In this modification, an L-shaped lever 26′ is employed instead of the combination of the levers 28 and 26 in the embodiment of FIG. 3. The lever 26′ is disposed below and adjacent to the platform 29 and pivotally connected at one end of the horizontal portion thereof to the frame of the copying apparatus by a pin *p*′. At the other end of the lever 26′, a bar portion 26*a*′ extends upwardly at right angles from the lever 26′, the tip of which bar portion 26a′ is adapted to engage a notch 29*a* formed in the under surface of the platform 29. The lever 26′ is normally urged clockwise by the spring 30 stretched between the lever 26′ and the frame of the apparatus, while the plunger 27*a* of the platform lock releasing solenoid 27 is connected to the lever 26′ at a position between the spring 30 and the pin *p*′ for turning the lever 26′ counterclockwise about the pin *p*′ when the solenoid 27 is energized for releasing the locking of the platform 29.

When the actuator SW1′ of the microswitch SW1 (FIG. 1) is depressed by the leading edge of the paper web R′ in a manner similar to the embodiment in FIG. 3, the corona chargers CH and the exposure lamp L are energized and simultaneously the solenoid 27 is actuated to turn the lever 26' counterclockwise by the plunger 27*a* to pull the bar portion 26*a'* of the lever 26' out of the notch 29*a* of the platform 29 and actuating the platform advancing clutch (not shown) connected to the driving means (not shown) actuated for turning the pinion 103 in the direction shown by the arrow B to advance the platform 29 in the scanning direction of the arrow a.

Following the rotation of the pinion 103 in the direction of arrow B, the cutting length setting lever 2 starts rotating in the direction of the arrow A. When the actuator SW2' of the microswitch SW2 is kicked by the lever 2, the feeding rollers *r*1' and *r*1 stop rotating with simultaneous operation of the cutter C to cut the paper web R', in which case the cut length of the printing paper is determined by the angle of rotation of the lever 2 form the start of rotaion thereof to the actuation of the microswitch SW2 thereby, and also by the distance between the cutter C and the microswitch SW1 along the paper path R*a* as in the embodiment in FIGS. 3 and 4.

The lever 2 further rotates after actuating the actuator SW2' of the microswitch SW2 and kicks the actuator SW3 ' of the microswitch SW3 at the moment when the trailing edge of the cut printing paper leaves the guide plates 17 of the exposure device E for de-energizing the corona chargers CH and the exposure lamp L, and simultaneously disengaging the platform advancing clutch (not shown), and engaging the platform returning clutch (not shown) instead, and for rotating the pinion 103 in the direction opposite to that shown by the arrow B and consequently moving the platform 29 in the returning direction shown by dotted line arrow *v*. Following the reverse rotation of the pinion 103, the lever 2 also rotates in the opposite direction, and when the platform 29 has returned to the original locking position with the bar portion 26*a'* of the lever 26 inserted in the notch 29*a* of the platform 29, the pinion 103 and the lever 2 stop rotating with the lever 2 and the platform 29 returned to the original printing starting position.

In the meantime, the cut printing paper is discharged onto the tray d after being processed by the corona chargers CH, the exposure device E, the developing device D and the fixing device F.

Although the rack 29*b* and the pinion 103 are employed for the platform reciprocating means in the above modification, belt means for example including a belt with a part thereof fixed to the platform and a roller associated therewith may be adopted for this purpose.

As is seen from the above description, in the modification of the invention in FIGS. 5 and 6, it is possible to carry out a subsequent copying operation as soon as the platform returns to the original starting position by returning the cut length setting lever for actuating the cutting instruction switch to the starting position for copying through the platform reciprocating means.

Furthermore, since the distance of advance of the platform is controlled depending on the cutting length of the printing paper web, the need for advancing the platform more than necessary is advantageously eliminated and the length to be cut is readily and quickly set by the cut size setting knob associated with the click means without any individual variations.

The foreging description of the present invention on the basis of the embodiment and the modification thereof relates to an electrophotographic copying apparatus with a movable platform on which an original to be copied is placed. However, it should be noted here that the use of the printing paper cutting device of the invention is not limited to the copying apparatus of the above described type, but is applicable to any electrophotographic copying apparatus of the slit exposure type including those having movable optical systems. For applying the printing paper cutting device of the invention to a copying apparatus with a movable optical system, the locking means for the platform described as employed in the embodiment of FIG. 3 can be utilized as locking means for the movable optical system, and in the modification of FIG. 5, the two gears or discs described as associated with the movement of the platform may be so arranged as to rotate in association with the reciprocating movement of the optical system.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. A printing paper cutting device for use in a copying apparatus having platform means on which an original to be copied is placed and an optical system means for transmitting an image from an original to printing paper, reciprocating driving means coupled to one of said means for driving the one means relative to the other for scanning the original to be copied, the apparatus further employing a roll of printing paper fed by transportation members, said device comprising a first switch member for actuating the reciprocating driving means, said first switch member being disposed along the path of the paper from said roll of printing paper and detecting a leading edge of said paper fed by the transportation members, a reciprocating means locking means for locking the reciprocating means in a starting position and coupled to said first switch member for being released by a signal from said first switch member, a rotary member adapted to start rotation at the same time said locking means has been released and to stop rotation when the rotary member has returned to a starting position, a cut length setting member movably mounted on said rotary member, click means operatively associated with said cut length setting member and said rotary member for controlling movement of said cut length setting member, step by step, to a desired cut length position on said rotary member corresponding to the length of the original to be copied, a cut size setting member connected with said cut length setting member for moving said cut length setting member on said rotary member, a second switch member in the path of said cut length setting member and actuated by said cut length setting member during the rotation of the cut length setting member, and a cutting means for cutting said paper web coupled to said second switch member and disposed along the path of the paper from the roll of printing paper and operated by a signal from said second switch member.

2. A printing paper cutting device as claimed in claim 1 wherein said reciprocating driving means comprises scanning and returning clutch means for reciprocating said one of said means, and a third switch member in the path of said cut length setting member and connected to said reciprocating driving means for disengaging the scanning clutch means and engaging the returning clutch means after said second switch member has been actuated.

3. A printing paper cutting device for use in a copying apparatus having a platform means on which an original to be copied is placed and an optical system means for transmitting an image from an original to printing paper, reciprocating driving means coupled to one of said means for driving the one means relative to the other for scanning the original to be copied, the apparatus further employing a roll of printing paper fed by transportation members, said device comprising a first switch member for actuating the reciprocating driving means, said first switch member being disposed along the path of the paper from said roll of printing paper and detecting a leading edge of said paper fed by the transportation members, a reciprocating means locking means for locking the reciprocating means in a starting position and coupled to said first switch member for being released by a signal from said first switch member, a rotary member, a rotary member locking means coupled to said reciprocating means locking means and released in association with the operation of said reciprocating means locking means, said rotary member being adapted to make one revolution in association with the operation of said transportation members after said rotary member locking means has been released, a cut length setting member movably mounted on said rotary member, click means operatively associated with said cut length setting member and said rotary member for controlling movement of said cut length setting member, step by step, to a desired cut length position on said rotary member corresponding to the length of the original to be copied, a cut size setting member connected with said cut length setting member for moving said cut length setting member on said rotary member, a second switch member in the path of said cut length setting member and actuated by said cut length setting member during the rotation of the cut length setting member, and a cutting means for cutting said paper web coupled to said second switch member and disposed along the path of the paper from the roll of printing paper and operated by a signal from said second switch member.

4. A printing paper cutting device as claimed in claim 3 wherein said reciprocating means locking means comprises a first lever member slidably disposed below and in a direction normal to said reciprocating means, spring means engaging the lower end of said first lever member for urging the upper end of said first lever member to engage a notch in said reciprocating means for locking of reciprocating means, and said rotary member locking means comprises a second lever member disposed below and parallel to said reciprocating means and pivotally connected at a middle portion thereof to said apparatus with one end of said second lever member adapted to engage a notch in said rotary member for locking said rotary member, the other end of said second lever member engaging said first lever member, spring means coupled to said second lever member for urging said second lever member clockwise, and solenoid means to which said first switch member is coupled and coupled to said second lever for rotating said second lever counter-clockwise, whereby when said solenoid means is energized, said other end of said second lever member depresses said first lever member to disengage the latter from said reciprocating means while said one end of said second lever member is disengaged from said notch on said rotary member.

5. A printing paper cutting device as claimed in claim 3, further comprising a friction member with which said rotary member is in sliding frictional contact during locking thereof, transmission means coupled to said friction member for rotating said friction member synchronously with said transportation members, whereby said rotary member rotates with said friction member when said rotary member is released from said locking.

6. A printing paper cutting device as claimed in claim 3 wherein said click means comprises spring means mounted on the same shaft as said cut length setting member, a supporting member disposed between said spring means and said rotary member, a pair of click balls supported by said supporting member, the surface of said rotary member having a plurality of dents therein at positions corresponding to said click balls, said spring means urging said click balls toward said rotary member, so that when said click balls fall into said dents, said cut length setting member rotates with said rotary member.

7. A printing paper cutting device for use in a copying apparatus having a platform means on which an original to be copied is placed and an optical system means for transmitting an original to printing paper, reciprocating driving means coupled to one of said means for driving the one means relative to the other for scanning the original to be copied, the apparatus further employing a roll of printing paper fed by transportation members, said device comprising a first switch member for actuating the reciprocating driving means, said first switch member being disposed along the path of the paper from said roll of printing paper and detecting a leading edge of said paper fed by the transportation members, a reciprocating means locking means for locking the reciprocating means in a starting position and coupled to said first switch member for being released by a signal from said first switch member, a rotary member adapted to rotate in one direction and the opposite direction in association with the reciprocating movement of said reciprocating means by said reciprocating driving means, a cut length setting member movably mounted on said rotary member, click means operatively associated with said cut length setting member and said rotary member for controlling movement of said cut length setting member, step by step, to a desired cut length position on said rotary member corresponding to the length of the original to be copied, a cut size setting member connected with said cut length setting member for moving said cut length setting member on said rotary member, a second switch member in the path of said cut length setting member and actuated by said cut length setting member during the rotation of the cut length setting member, and a cutting means for cutting said paper web coupled to said second switch member and disposed along the path of the paper from the roll of printing paper and operated by a signal from said second switch member.

8. A printing paper cutting device as claimed in claim 7, wherein said click means comprises spring means mounted on the same shaft as said cut length setting member, a supporting member disposed between said spring means and said rotary member, a pair of click balls supported by said supporting member, the surface of said rotary member having a plurality of dents therein at positions corresponding to said click balls, said spring means urging said click balls toward said rotary member, so that when said click balls fall into said dents, said cut length setting member rotates with said rotary member.

9. A printing paper cutting device as claimed in claim 7 wherein said reciprocating driving means comprises scanning and platform returning clutch means for reciprocating said reciprocating means, and a third switch member in the path of said cut length setting member and connected to said reciprocating driving means for disengaging the scanning clutch means and engaging the returning clutch means after said second switch member has been actuated.

10. A printing paper cutting device for use in a copying apparatus having a reciprocating platform on which an original to be copied is placed and driven by a platform driving means and employing a roll of printing paper fed by transportation members, said device comprising a first switch member for actuating the platform driving means, said first switch member being disposed along the path of the paper from said roll of printing paper and detecting a leading edge of said paper fed by the transportation members, a platform locking means for locking the platform in a starting position and coupled to said first switch member for being released by a signal from said first switch member, a rotary member adapted to start rotation at the same time said platform locking means has been released and to stop rotation when the rotary member has returned to a starting position, a cut length setting member movably mounted on said rotary member, click means operatively associated with said cut length setting member and said rotary member for controlling movement of said cut length setting member, step by step, to a desired cut length position on said rotary member corresponding to the length of the original to be copied, a cut size setting member connected with said cut length setting member for moving said cut length setting member on said rotary member, a second switch member in the path of said cut length setting member and actuated by said cut length setting member during the rotation of the cut length setting member, and a cutting means for cutting said paper web coupled to said second switch member and disposed along the path of the paper from the roll of printing paper and operated by a signal from said second switch member.

11. A printing paper cutting device as claimed in claim 10, wherein said platform driving means comprises platform scanning and platform returning clutch means for reciprocating said reciprocating platform, and a third member in the path of said cut length setting member and connected to said platform driving means for disengaging the platform scanning clutch means and engaging the platform returning clutch means after said second switch member has been actuated.

12. A printing paper cutting device for use in a copying apparatus having a reciprocating platform on which an original to be copied is placed and driven by a platform driving means and employing a roll of printing paper fed by transportation members, said device comprising a first switch member for actuating the platform driving means, said first switch member being disposed along the path of the paper from said roll of printing paper and detecting a leading edge of said paper fed by the transportation members, a platform locking means for locking the platform in a starting position and coupled to said first switch member for being released by a signal from said first switch member, a rotary member, a rotary member locking means coupled to said platform locking means and released in association with the operation of said platform locking means, said rotary member being adapted to make one revolution in association with the operation of said transportation members after said rotary member locking means has been released, a cut length setting member movably mounted on said rotary member, click means operatively associated with said cut length setting member and said rotary member for controlling movement of said cut length setting member, step by step to a desired cut length position on said rotary member corresponding to the length of the original to be copied, a cut size setting member connected with said cut length setting member for moving said cut length setting member on said rotary member, a second switch member in the path of said cut length setting member and actuated by said cut length setting member during the rotation of the cut length setting member, and a cutting means for cutting said paper web coupled to said second switch member and disposed along the path of the paper from the roll of printing paper and operated by a signal from said second switch member.

13. A printing paper cutting device as claimed in claim 12, wherein said platform locking means comprises a first lever member slidably disposed below and in a direction normal to said platform, spring means engaging the lower end of said first lever member for urging the upper end of said first lever member to engage a notch in said platform for locking of said platform, and said rotary member locking means comprises a second lever member disposed below and parallel to said platform and pivotally connected at a middle portion thereof to said apparatus with one end of said second lever member adapted to engage a notch in said rotary member for locking said rotary member, the other end of said second lever member engaging said first lever member, spring means coupled to said second lever member for urging said second lever member clockwise, and solenoid means to which said first switch member is coupled and coupled to said second lever for rotating said second lever counter-clockwise, whereby when said solenoid means is energized, said other end of said second lever member depresses said first lever member to disengage the latter from said platform while said one end of said second lever member is disengaged from said notch on said rotary member.

14. A printing paper cutting device as claimed in claim 12, further comprising a friction member with which said rotary member is in sliding frictional contact during locking thereof, transmission means coupled to said friction member for rotating said friction plate synchronously with said transportation members, whereby said rotary member rotates with said friction member when said rotary member is released from said locking.

15. A printing paper cutting device as claimed in claim 12, wherein said click means comprises spring means mounted on the same shaft as said cut length setting member, a supporting member disposed between said spring means and said rotary member, a pair of click balls supported by said supporting member, the surface of said rotary plate member having a plurality of dents therein at positions corresponding to said click balls, said spring means urging said click balls toward said rotary member, so that when said click balls fall into said dents, said cut length setting member rotates with said rotary member.

16. A printing paper cutting device for use in a copying apparatus having a reciprocating platform on which an original to be copied is placed and driven by a platform driving means and employing a roll of printing paper fed by transportation members, said device comprising a first switch member for actuating the platform driving means, said first switch member being disposed along the path of the paper from said roll of printing paper and detecting a leading edge of said paper fed by the transportation members, a platform locking means for locking the platform in a starting position and coupled to said first switch member for being released by a signal from said first switch member, a rotary member adapted to rotate in one direction and the opposite direction in association with the reciprocating movement of said platform by said platform driving means, a cut length setting member movably mounted on said rotary member, click means operatively associated with said cut length setting member and said rotary member for controlling movement of said cut length setting member, step by step, to a desired cut length position on said rotary member corresponding to the length of the original to be copied, a cut size setting member connected with said cut length setting member for moving said cut length setting member on said rotary member, a second switch member in the path of said cut length setting member and actuated by said cut length setting member during the rotation of the cut length setting member, and a cutting means for cutting said paper web coupled to said second switch member and disposed along the path of the paper from the roll of printing paper and operated by a signal from said second switch member.

17. A printing paper cutting device as claimed in claim 16 wherein said click means comprises spring means mounted on the same shaft as said cut length setting member, a supporting member disposed between said spring means and said rotary member, a pair of click balls supported by said supporting member, the surface of said rotary member having a plurality of dents therein at positions corresponding to said click balls, said spring means urging said click balls toward said rotary member, so that when said click balls fall into said dents, said cut length setting member rotates with said rotary plate member.

18. A printing paper cutting device as claimed in claim 16 wherein said platform driving means comprises platform scanning and platform returning clutch means for reciprocating said reciprocating platform, and a third switch member in the path of said cut length setting member and connected to said platform driving means for disengaging the platform scanning clutch means and engaging the platform returning clutch means after said second switch member has been actuated.

* * * * *